United States Patent
Shan et al.

(10) Patent No.: US 10,112,661 B2
(45) Date of Patent: Oct. 30, 2018

(54) TRACK HITCHING STRUCTURE FOR WHEELED CRANE AND WHEELED CRANE

(71) Applicant: Xuzhou Heavy Machinery Co., Ltd., Xuzhou, Jiangsu Province (CN)

(72) Inventors: Zenghai Shan, Xuzhou (CN); Honggang Ding, Xuzhou (CN); Shanhua Ma, Xuzhou (CN); Fuyi Zhang, Xuzhou (CN); Peng Gong, Xuzhou (CN); Yuelei Duan, Xuzhou (CN); Dezhi Xu, Xuzhou (CN); Yanlei Zhang, Xuzhou (CN)

(73) Assignee: Xuzhou Heavy Machinery Co., Ltd., Xuzhou (CN)

(*) Notice: Subject to any disclaimer, the term of this patent is extended or adjusted under 35 U.S.C. 154(b) by 0 days.

(21) Appl. No.: 15/624,169

(22) Filed: Jun. 15, 2017

(65) Prior Publication Data
US 2017/0282984 A1    Oct. 5, 2017

Related U.S. Application Data

(63) Continuation of application No. PCT/CN2014/093797, filed on Dec. 15, 2014.

(51) Int. Cl.
*B62D 55/04* (2006.01)
*B62D 55/084* (2006.01)
(Continued)

(52) U.S. Cl.
CPC ........... *B62D 55/084* (2013.01); *B62D 55/02* (2013.01); *B62D 55/04* (2013.01); *B62D 55/32* (2013.01); *B66C 23/44* (2013.01); *B66C 23/62* (2013.01)

(58) Field of Classification Search
CPC .... B62D 55/084; B62D 55/04; B66C 23/365; B66C 23/44; E02F 9/024
See application file for complete search history.

(56) References Cited

U.S. PATENT DOCUMENTS

| 2,681,231 A | 6/1954 | Kondracki |
| 3,385,014 A | 5/1968 | Haug |

(Continued)

FOREIGN PATENT DOCUMENTS

| CN | 1572981 A | 2/2005 |
| CN | 202897880 U | 4/2013 |

(Continued)

OTHER PUBLICATIONS

English translation of International Search Report dated Apr. 29, 2015 in International Application No. PCT/CN2014/093797. 2 pages.

(Continued)

*Primary Examiner* — Joseph M Rocca
*Assistant Examiner* — Daniel S Yeagley
(74) *Attorney, Agent, or Firm* — Kilpatrick Townsend & Stockton LLP

(57) ABSTRACT

A track hitching structure is for a wheeled crane and the wheeled crane, and includes a vehicle frame and a connecting cross beam. The first end of the connecting cross beam is connected with a track. The second end of the connecting cross beam is connected with the vehicle frame. The second end of the connecting cross beam is higher than the first end of the connecting cross beam. The vehicle frame is connected with the track by the connecting cross beam with one high end and one low end, so the long-distance force transfer from the track to the race of the vehicle frame can be handled, then the shortcomings of tedious structure, large size, large weight and the like of the connecting device (Continued)

caused by a horizontal connecting cross beam are avoided, and the reliability and the working performance of the entire crane are improved.

16 Claims, 21 Drawing Sheets

(51) Int. Cl.
*B66C 23/62* (2006.01)
*B62D 55/32* (2006.01)
*B66C 23/44* (2006.01)
*B62D 55/02* (2006.01)

(56) References Cited

U.S. PATENT DOCUMENTS

| | | | | |
|---|---|---|---|---|
| 3,712,398 | A | * | 1/1973 | Althaus ................ B62D 55/084 |
| | | | | 180/9.48 |
| 3,929,204 | A | * | 12/1975 | Newell ..................... B60P 3/28 |
| | | | | 180/9.21 |
| 4,000,784 | A | | 1/1977 | Morrow, Sr. et al. |
| 4,341,276 | A | * | 7/1982 | Furuichi .............. B62D 55/084 |
| | | | | 180/9.48 |
| 4,640,421 | A | * | 2/1987 | Mason ................... B66C 23/78 |
| | | | | 180/9.26 |
| 5,901,800 | A | * | 5/1999 | Wilson ............... B62D 49/0678 |
| | | | | 180/298 |
| 2007/0221600 | A1 | * | 9/2007 | Davis ..................... B66C 23/36 |
| | | | | 212/270 |

FOREIGN PATENT DOCUMENTS

| | | |
|---|---|---|
| CN | 103496410 A | 1/2014 |
| CN | 104477792 A | 4/2015 |
| CN | 204324757 U | 5/2015 |
| EP | 0803428 A1 | 10/1997 |
| JP | 5930782 U | 2/1984 |
| JP | 62120079 U | 7/1987 |
| JP | 2004196131 A | 7/2004 |

OTHER PUBLICATIONS

English translation of Office Action and Search Report dated May 28, 2018 in RU Patent Application No. 2017122470. 5 pages.

* cited by examiner

TRACK HITCHING STRUCTURE FOR WHEELED CRANE AND WHEELED CRANE

CROSS-REFERENCES TO RELATED APPLICATIONS

This application is a continuation application of International Application No. PCT/CN2014/093797 entitled "TRACK HITCHING STRUCTURE FOR WHEELED CRANE AND WHEELED CRANE," filed on Dec. 15, 2014, which is herein incorporated by reference in its entirety for all purposes.

BACKGROUND

A wheeled crane is a full-circle slewing crane in which a hoisting operation part is installed on a specially-made chassis, and has the advantages of being flexible and convenient for transition and so on. The wheeled crane is an important part of crane equipment, and mainly includes truck cranes, all-terrain cranes, mobile cranes and other products. The products have the advantages of good flexibility, fast transition, high operation efficiency and the like; but part of the products (e.g., the truck cranes) must be supported by supporting legs during working, cannot travel with load and are not suitable for working on soft or muddy fields. Although part of the products (e.g., the mobile cranes) can achieve tire supported operations and travel with load, due to the limitations of the carrying capacity of tires and axles and the larger ground pressure, the requirements for the ground conditions are higher, and the performance is lower in general.

A track crane is a swing arm rotary crane in which the hoisting operation part is installed on a track chassis. It walks depending on a track attachment, has a large grounding area, good trafficability and strong adaptability and can travel with load. Due to its structural limitations, the damage of the track to the pavement is larger, thus the track crane cannot travel on roads. Moreover, the travelling speed of the track crane is low, so the track crane needs to be detached and carried by other vehicles when transferred to other construction sites, and the track crane needs to be re-assembled on another construction site, therefore the working efficiency is low, the transport cost is high, the application range is small, and the limitation is larger.

In the prior art, there has been a technical solution of adding a detachable track structure on the existing wheeled crane to quickly change the wheeled crane into a track crane so as to meet the hoisting operation requirements of different pavement conditions, expand the application range of the product and achieve multiple objectives of one crane.

As shown in FIG. 1A and FIG. 1B, one technical solution of adding a track attachment on the wheeled crane in the prior art is shown, a first connecting device 2', a second connecting device 3' and a connecting cross beam 4' are added on a chassis 1' of the wheeled crane in a building block manner so as to achieve force transfer, and a universal track 5' of the track crane is adopted for connection so as to achieve the conversion of the wheeled crane and the track crane.

The specific implementation process of the above-mentioned technical solution is as follows:

1) As shown in FIG. 2, the first connecting device 2' is lifted to a bottom surface of a race of the chassis 1' by an auxiliary oil cylinder 6', and a bolt connecting hole on the first connecting device 2' is aligned to the bolt connecting hole on the race and is fixed by a bolt.

2) As shown in FIG. 3, the second connecting device 3' is lifted by the auxiliary oil cylinder 6', and a connecting hole 31' on the second connecting device 3' is aligned to a connecting hole 21' on the first connecting device 2' and then is fixed by propelling a locking shaft by a locking oil cylinder.

3) As shown in FIG. 4, the connecting cross beam 4' is connected with the second connecting device 3' by a bolt, and so far, the structure and the position of the connecting cross beam 4' are the same as those of a cross beam of a conventional track crane.

4) As shown in FIG. 5, the connection mode of the connecting cross beam 4' and the track 5' is a conventional connection mode of the track crane, and so far, the conversion from the wheeled crane to the track crane is accomplished.

In the above-mentioned technical solution, after a vehicle frame of the wheeled crane is assembled with the first connecting device 2', the second connecting device 3' and the connecting cross beam 4', the structure and the position of the connecting cross beam 4' are the same as those of the conventional track crane, that is, the track can be installed according to the track installation steps of the conventional track crane. The first connecting device 2' and the second connecting device 3' can also be integrated, they are difficult to detach because they are connected with vehicle frame by bolt and are not detached in general in the state of the wheeled crane, and if the first connecting device and the second connecting device are split, the equipment weight in the transport state of the wheeled crane can be effectively reduced, and the travelling ability is improved.

The above-mentioned technical solution of adding the detachable track structure on the existing wheeled crane has the following shortcomings:

1) The track of the conventional track crane is adopted in the track connection, and the stress of the entire crane needs to be transferred from the race of the vehicle frame to the track during the operation in a track state. As the cross beam of the track is horizontally arranged, due to the structural limitation, the distance between the bottom surface of the race of the wheeled crane and the cross beam is quite large, the transfer distance is large, and the first connecting device and the second connecting device are arranged to counteract the distance. As the connecting devices bear all the working loads, when such a long distance connection is performed, the weight of a state conversion device is too large, and the working performance of the track crane state is reduced.

2) The connecting devices are located below the race, even if the supporting legs of the crane are lifted up, due to the relationship between related components of the chassis, the operation space is very narrow, and thus the installation is difficult.

3) The connecting devices usually adopt the connection mode of bolts and pin shafts, so high manufacturing precision at matching structure sites is required; and in addition, the connection points of bolt connection are numerous, resulting in a long installation time and increased fault points.

BRIEF SUMMARY

The objective of the present invention is to provide a track hitching structure for a wheeled crane and the wheeled crane. The track hitching structure can improve the working performance of the entire crane and the conversion efficiency between a wheeled crane and a track crane.

In order to achieve the above-mentioned objective, the present invention provides a track hitching structure for a wheeled crane, including a vehicle frame and a connecting cross beam, wherein the first end of the connecting cross beam is connected with a track, the second end of the connecting cross beam is connected with the vehicle frame, and the second end of the connecting cross beam is higher than the first end of the connecting cross beam.

In a preferred or optional embodiment, the connecting cross beam is of an integral structure and is in the shape of Z, S or a bent beam shape with a high end and a low end.

In a preferred or optional embodiment, the connecting cross beam is of a box structure, a vehicle frame box structure matched with the connecting cross beam is arranged on the vehicle frame, and the connecting cross beam is inserted into the vehicle frame box structure.

In a preferred or optional embodiment, an oil cylinder is arranged in the vehicle frame box structure, one end of the oil cylinder is fixedly connected with the vehicle frame, the other end of the oil cylinder is connected with the second end of the connecting cross beam, and the connecting cross beam is able to be pulled into the vehicle frame box structure by the oil cylinder and locked.

In a preferred or optional embodiment, the second end of the connecting cross beam is inserted into the vehicle frame box structure, an inclined plane structure is provided on the second end close to the oil cylinder, a locating wedge block is arranged in the vehicle frame box structure, and when the oil cylinder pulls the connecting cross beam to a locking position in the vehicle frame box structure, the inclined plane structure on the connecting cross beam is engaged with the locating wedge block.

In a preferred or optional embodiment, the second end of the connecting cross beam is inserted into the vehicle frame box structure, a position on the second end away from the oil cylinder is provided with a connecting cross beam lapping block, and a vehicle frame lapping block engaged with the connecting cross beam lapping block is arranged in the vehicle frame box structure.

In a preferred or optional embodiment, the connecting cross beam is connected with the oil cylinder by a connecting lug seat and a guide seat, the connecting lug seat is arranged at the second end of the connecting cross beam, is V-shaped and has a wide upper part and a narrow lower part, the guide seat is arranged at the end part of the oil cylinder, a V-shaped groove having a wide upper part and a narrow lower part is formed in the middle of the guide seat, the V-shaped connecting lug seat is arranged in the V-shaped groove, a transverse connecting lug is further arranged on the connecting lug seat, and both ends of the transverse connecting lug are correspondingly arranged in two arc-shaped grooves, the two arc-shaped grooves are correspondingly arranged on both sides of the V-shaped groove in the guide seat.

In a preferred or optional embodiment, a V-shaped opening is formed in the upper part of the arc-shaped groove, the lower part of the arc-shaped groove is of a semicircular structure, the transverse connecting lug is placed in the semicircular structure, and an anti-drop structure protruding toward the interior of the arc-shaped groove is arranged at an intersection position of the V-shaped opening and the semicircular structure.

In a preferred or optional embodiment, low-position guide beams are arranged at the lower parts of both sides of the guide seat, guide rails are formed between a bottom plate in the vehicle frame box structure and side edge locating plates above both sides of the bottom plate, and each low-position guide beam correspondingly slides in one guide rail.

In a preferred or optional embodiment, alignment adjusting devices for adjusting the guide seat to align to the connecting lug seat are arranged on the guide beams on both sides of the guide seat.

In a preferred or optional embodiment, the alignment adjusting device includes an adjusting slider arranged in the low-position guide beam, one end of the adjusting slider abuts on the vehicle frame box structure, the other end of the adjusting slider is connected with an adjusting bolt, the adjusting bolt extends through the low-position guide beam and is in threaded connection with an adjusting nut that is fixedly arranged on the low-position guide beam, and after the guide seat is adjusted to align to the connecting lug seat by the adjusting bolt and the adjusting slider, a fastening nut is arranged on the adjusting bolt for locating.

In order to achieve the above-mentioned objective, the present invention provides a wheeled crane, including a track and the track hitching structure for the wheeled crane in any above-mentioned embodiment, and the wheeled crane cooperates with the track hitching structure for the wheeled crane by means of its own hoisting function to achieve the self disassembly and assembly of the track.

Based on the above-mentioned technical solutions, the present invention at least has the following beneficial effects:

According to the track hitching structure for the wheeled crane provided by the present invention, the vehicle frame is connected with the track by the similarly Z-shaped integral cross beam with one high end and one low end, so the long-distance force transfer from the track to the race of the vehicle frame can be handled, then the shortcomings of tedious structure, large size, large weight and the like of the connecting device caused by a horizontal connecting cross beam are avoided, and the reliability and the working performance of the entire crane are improved.

The wheeled crane provided by the present invention cooperates with the track hitching structure for the wheeled crane by means of its own hoisting function to achieve the self disassembly and assembly of the track, so that the conversion between the wheeled crane and the track crane is fast and efficient, the utilization rate of the product is improved, and the cost is reduced.

BRIEF DESCRIPTION OF THE DRAWINGS

The drawings described herein are used for providing a further understanding of the present invention and constituting a part of the application. Illustrative embodiments of the present invention and illustrations thereof are used for explaining the present invention rather than constituting improper limitations to the present invention. In the drawings.

REFERENCE SIGNS

Figure 1A:
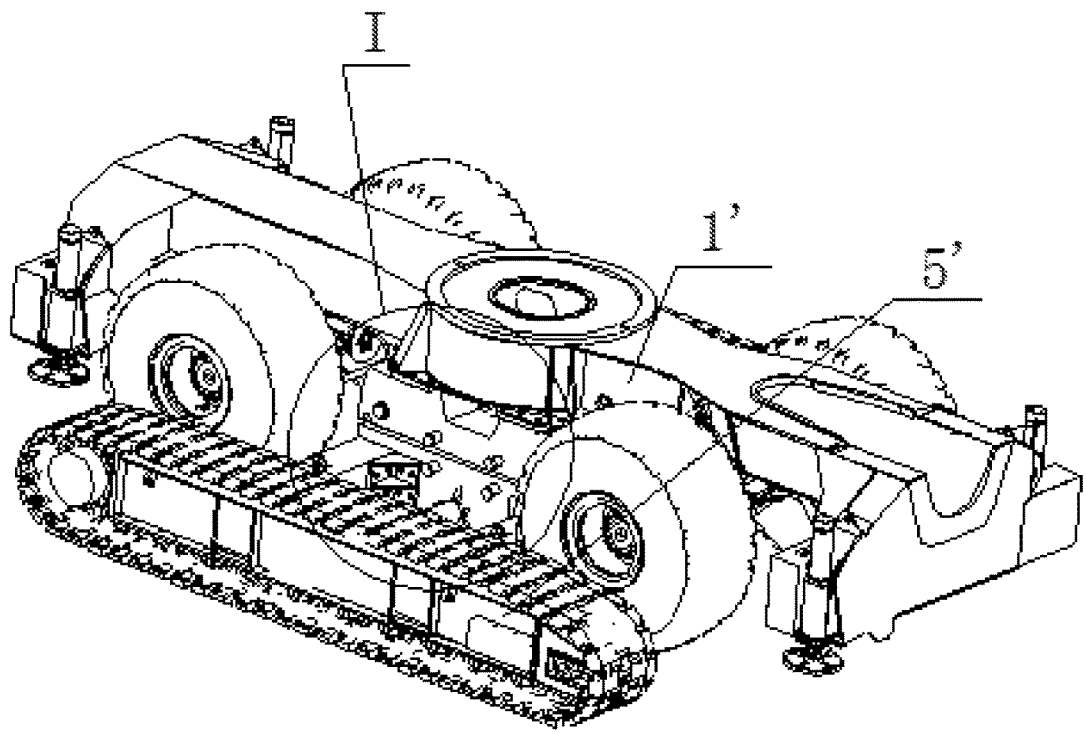
FIG. 1A is a schematic diagram of a track structure hitched on a wheeled crane in the prior art.
Figure 1B:
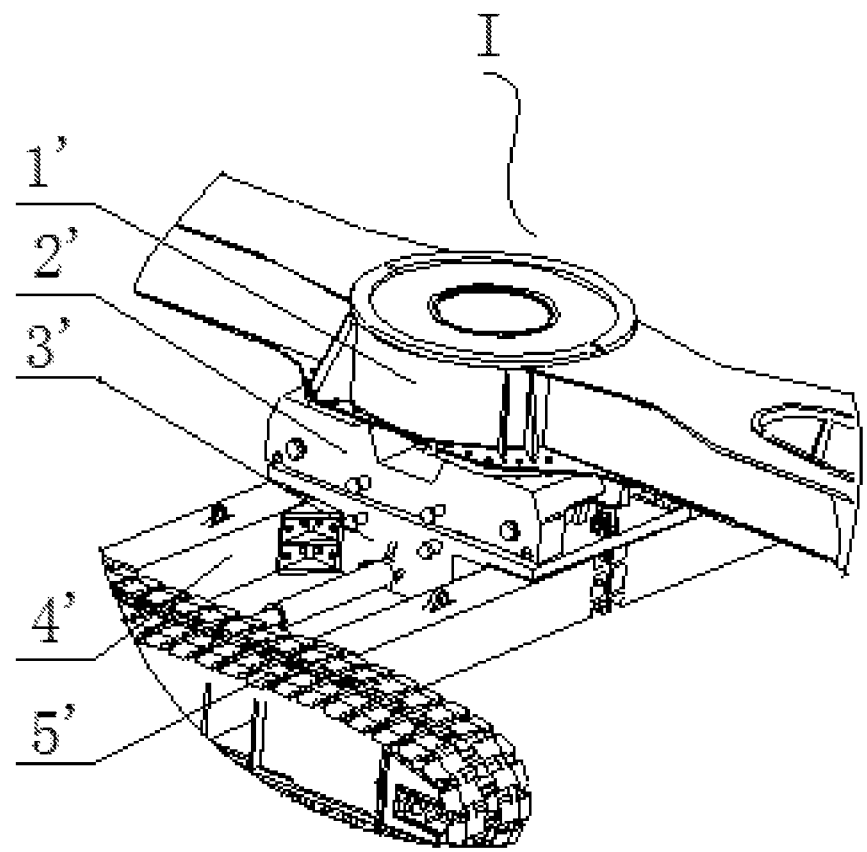
FIG. 1B is a schematic diagram of an "I" partial enlargement structure in FIG. 1A.
Figure 2:
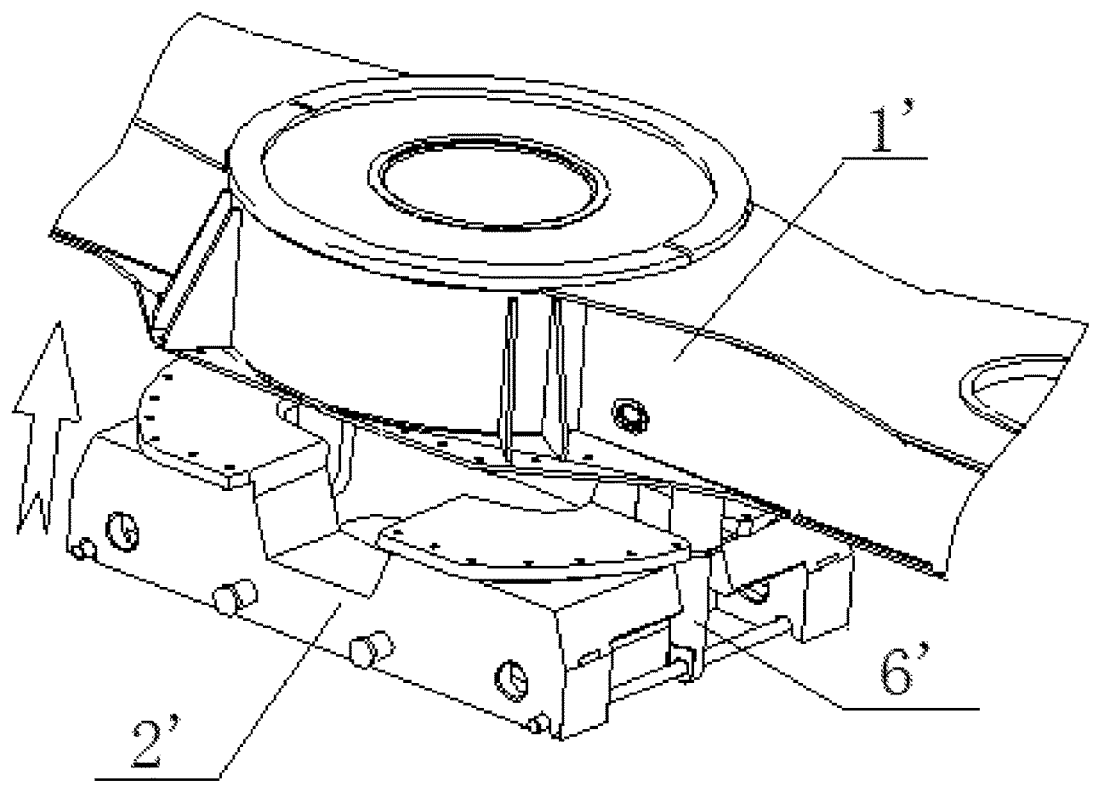
FIG. 2 is a schematic diagram of hitching of a first connecting device and a race in the prior art.
Figure 3:
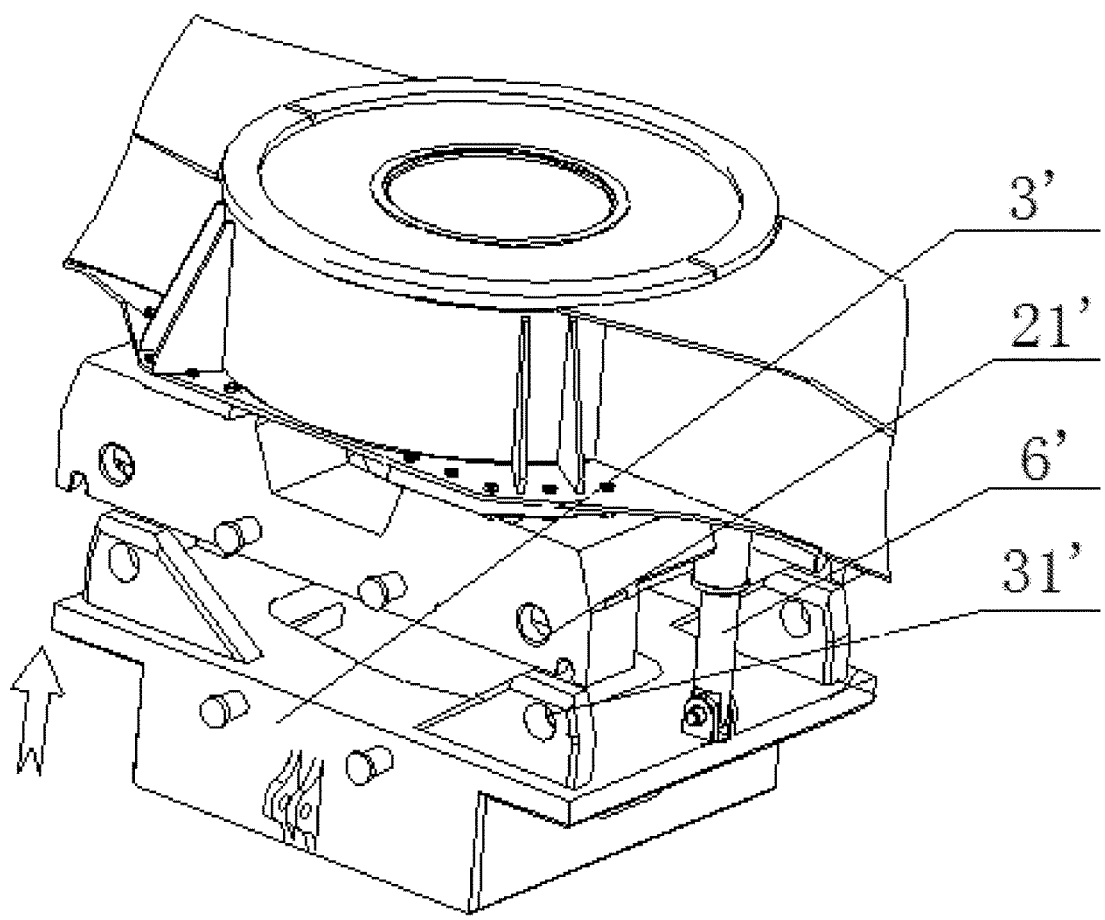
FIG. 3 is a schematic diagram of hitching of a second connecting device and the first connecting device in the prior art.
Figure 4:
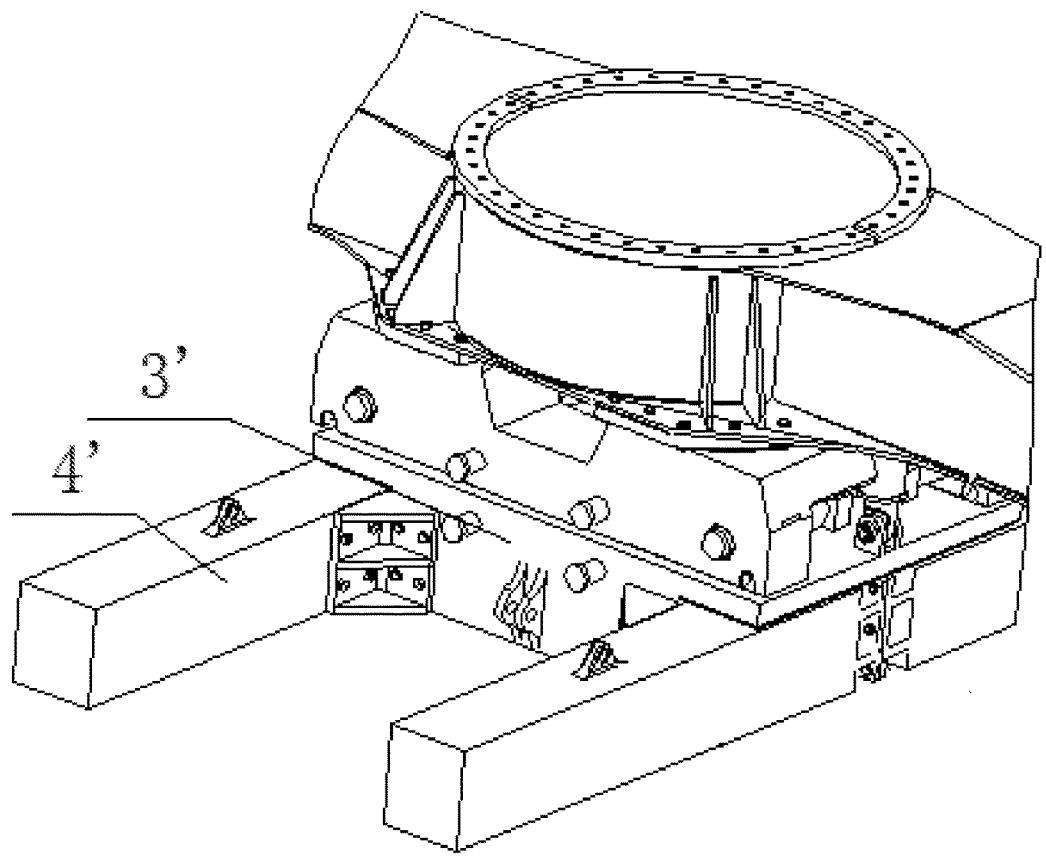
FIG. 4 is a schematic diagram of connection of a connecting cross beam and the second connecting device in the prior art.
Figure 5:
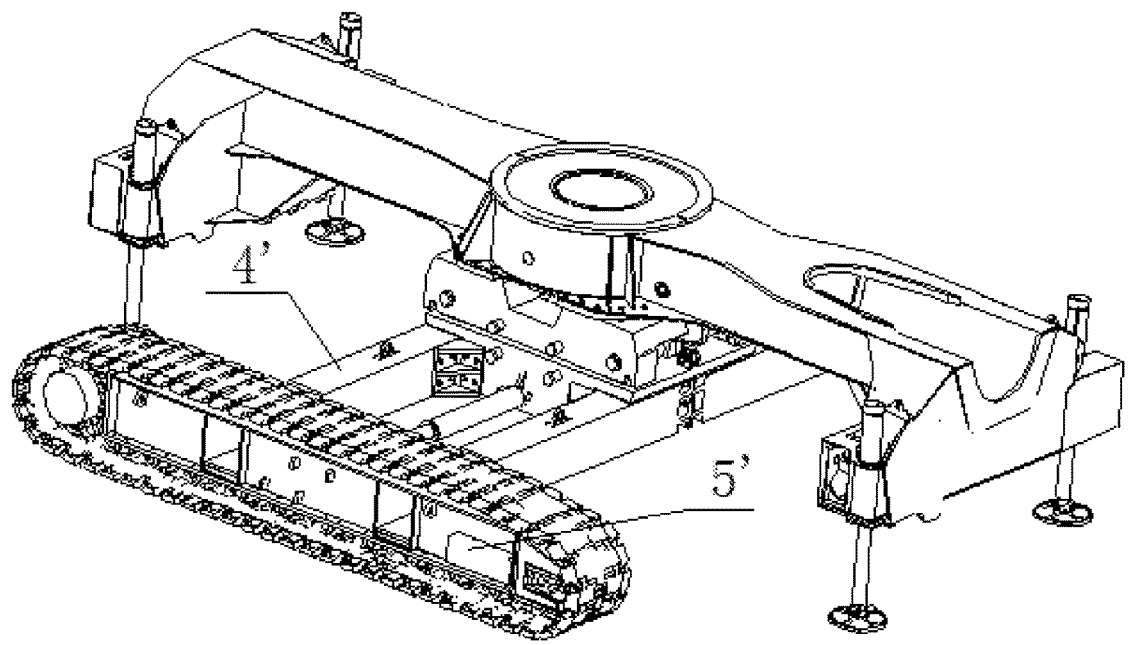
FIG. 5 is a schematic diagram of connection of a track structure and the connecting cross beam in the prior art.

1—vehicle frame; 2—track; 3—connecting cross beam; 4—vehicle frame box structure; 5—oil cylinder; 6—inclined plane structure; 7—locating wedge block; 8—cross beam lapping block; 9—vehicle frame lapping block; 10—connecting lug seat; 11—guide seat; 12—V-shaped groove; 13—transverse connecting lug; 14—arc-shaped groove; 15—anti-drop structure; 16—low-position guide beam; 17—box-shaped bottom plate; 18—side edge locating plate; 19—alignment adjusting device; 20—adjusting slider; 21—adjusting bolt; 22—adjusting nut; and 23—fastening nut.

DETAILED DESCRIPTION OF THE INVENTION

A clear and complete description of technical solutions in the embodiments of the present invention will be given below, in combination with the drawings in the embodiments of the present invention. Apparently, the embodiments described below are merely a part, but not all, of the embodiments of the present invention. All of the other embodiments, obtained by those of ordinary skill in the art based on the embodiments of the present invention without any creative effort, shall fall into the protection scope of the present invention.

In the description of the present invention, it should be understood that orientations or positional relationships indicated by the terms "center", "longitudinal", "transverse", "front", "rear", "left", "right", "vertical", "horizontal", "top", "bottom", "inside", "outside" and the like are orientations or positional relationships as shown in the drawings, are merely for the objective of facilitating the description of the present invention and simplifying the description, rather than indicating or implying that the indicated devices or elements must have specific orientations or constructed and operated in specific orientations, and thus cannot be understood as limitation to the protection scope of the present invention.

Figure 6:
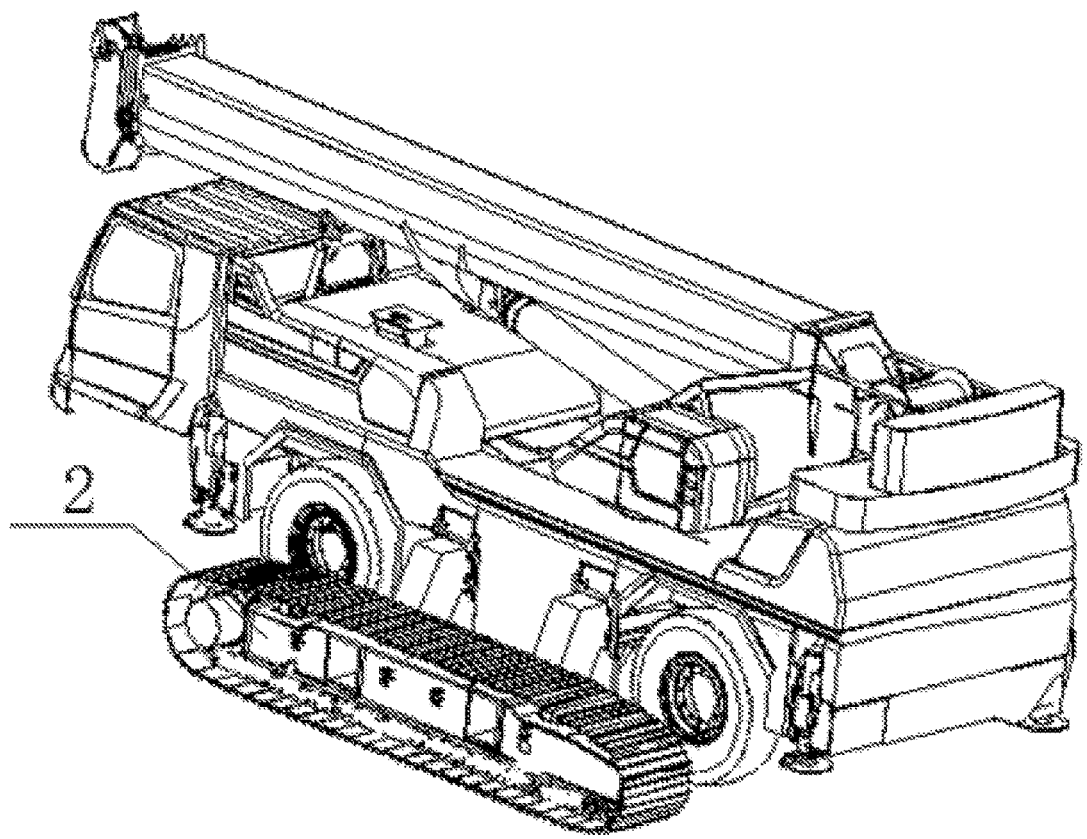
FIG. 6 is a structural schematic diagram of a track hitched on a wheeled crane provided by the present invention.
Figure 7:
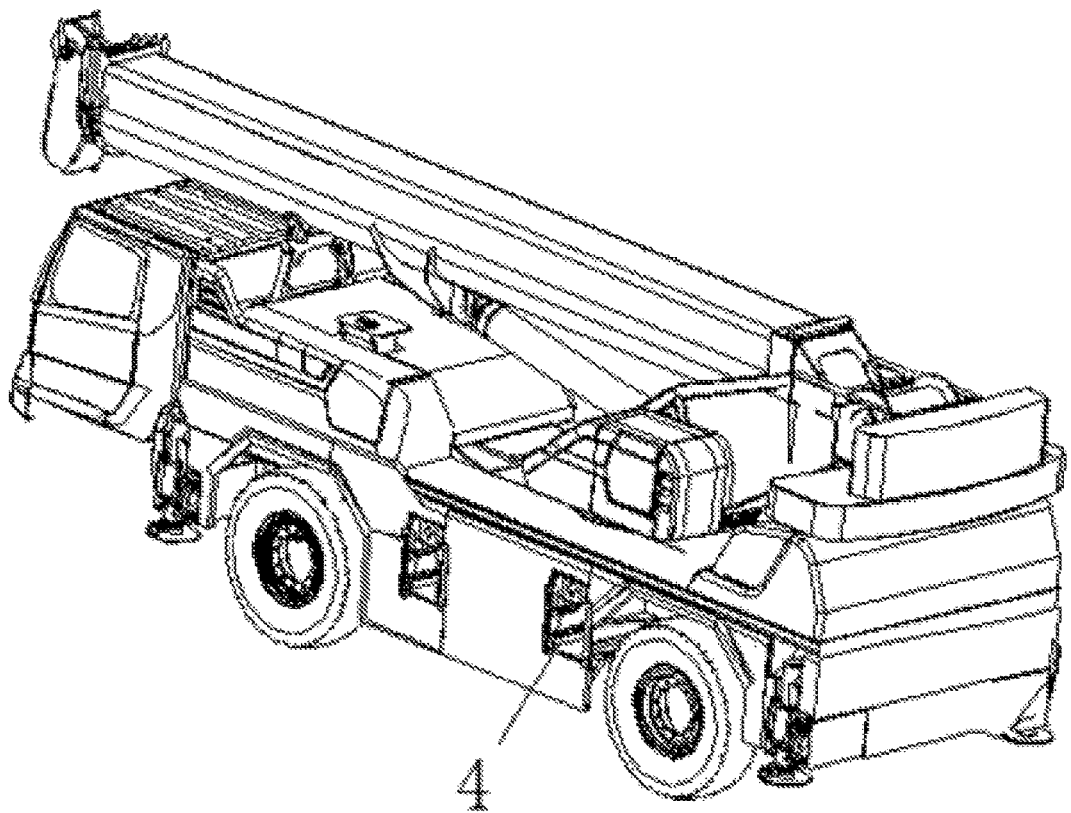
FIG. 7 is a schematic diagram of a vehicle frame box structure arranged on the wheeled crane provided by the present invention.

FIG. 6 shows a wheeled crane provided with a track hitching structure for the wheeled crane provided by the present invention, and FIG. 7 shows the wheeled crane with a track 2 detached.

Figure 8:
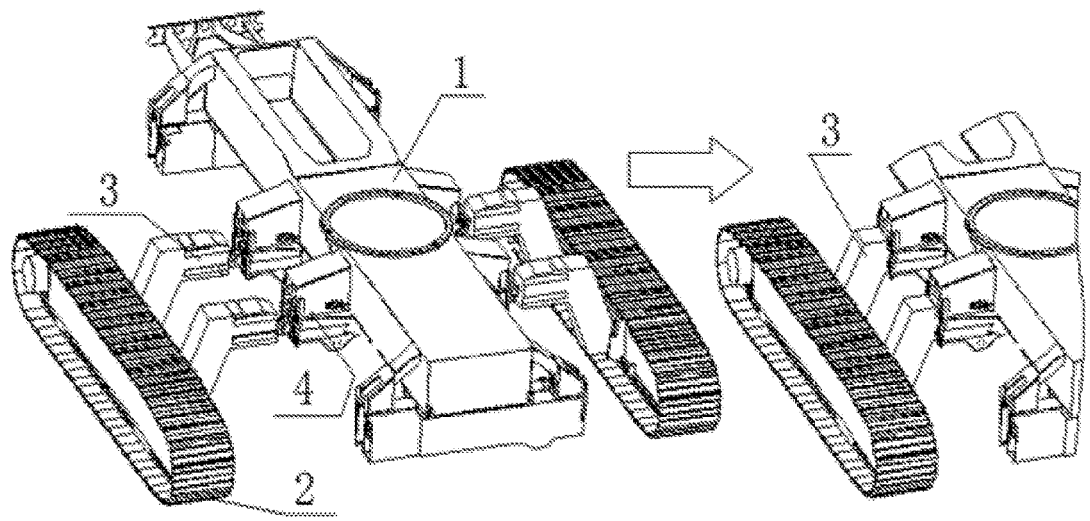
FIG. 8 is a structural schematic diagram of the vehicle frame box structure and a connecting cross beam from hitching to hitching completion provided by the present invention.

As shown in FIG. 8, it is a schematic embodiment of the track hitching structure for the wheeled crane provided by the present invention. In the schematic embodiment, the track hitching structure for the wheeled crane includes a vehicle frame 1 and a connecting cross beam 3, the connecting cross beam 3 is of an integral structure, the overall outline thereof is a bent beam structure similar to Z shape, S shape or a bent beam shape with a high end and a low end, the first end of the connecting cross beam 3 is connected with a track 2, and the second end of the connecting cross beam 3 is connected with the vehicle frame 1. The second end of the connecting cross beam 3 is higher than the first end of the connecting cross beam 3.

In the above-mentioned schematic embodiment, the structure of the track connecting cross beam 3 which is similar to the Z shape on the whole and has one high end and one low end can handle long-distance force transfer from the track 2 to the race of the vehicle frame 1, and avoid the shortcomings of tedious structure, large size, large weight and the like of the connecting device caused by a horizontal connecting cross beam in the prior art.

Figure 9:
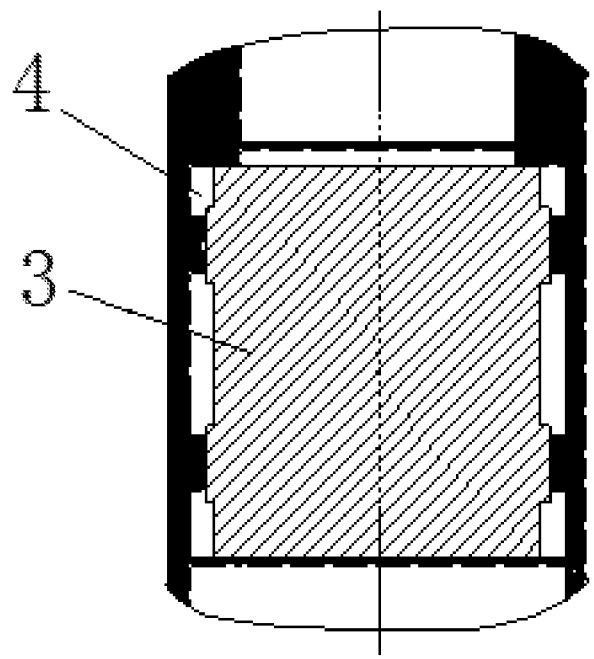
FIG. 9 is a sectional schematic diagram of matched sections of the vehicle frame box structure and a box structure of the connecting cross beam provided by the present invention.

FIG. 8 shows different states of the similarly Z-shaped connecting cross beam 3 provided by the present invention from hitching with the vehicle frame 1 to hitching completion. In the schematic embodiment of the track hitching structure for the wheeled crane provided by the present invention, the connecting cross beam 3 can be of a box structure, a vehicle frame box structure 4 matched with the connecting cross beam 3 can be arranged on the vehicle frame 1, the connecting cross beam 3 is inserted into the vehicle frame box structure 4 (as shown in FIG. 9), the vehicle frame box structure 4 can be arranged at the side of the vehicle frame 1 instead of being arranged below the race, thereby avoiding the problems of narrow operation space and installation difficulty.

In the above-mentioned schematic embodiment, due to adoption of the similarly Z-shaped integral connecting cross beam 3 connected with the vehicle frame box structure 4, stress transfer can be achieved by the cooperation of the box structure of the connecting cross beam 3 and the vehicle frame box structure 4.

Figure 10:
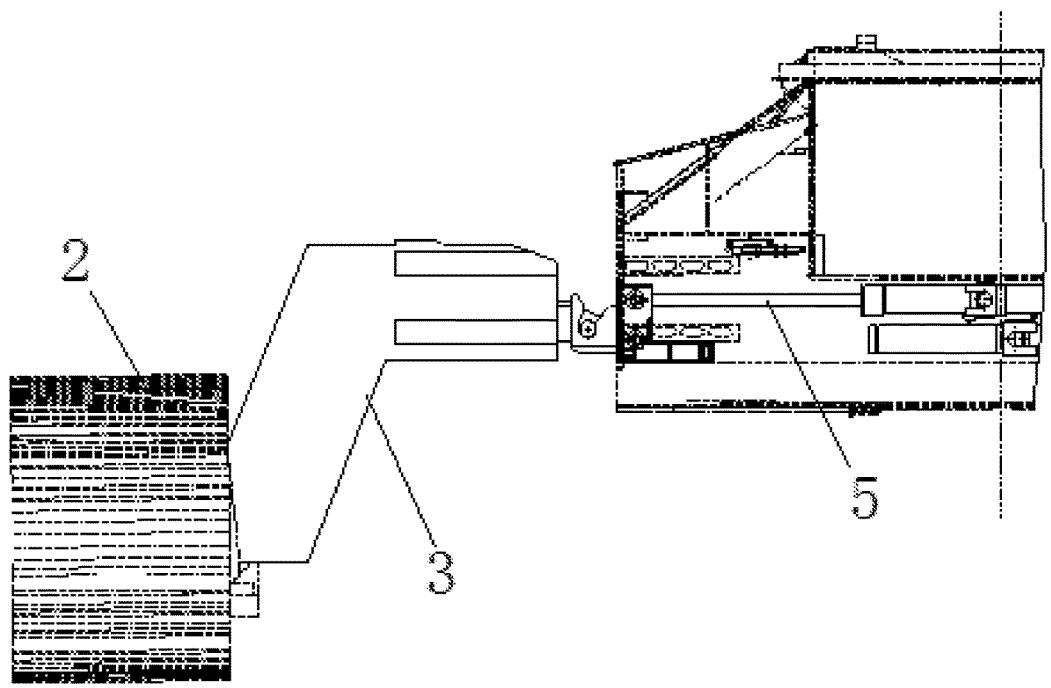
FIG. 10 is a structural schematic diagram of initial pull of the connecting cross beam by an oil cylinder provided by the present invention.

As shown in FIG. 10, in the schematic embodiment of the track hitching structure for the wheeled crane provided by the present invention, an oil cylinder 5 can be arranged in the vehicle frame box structure 4, one end of the oil cylinder 5 is fixedly connected with the vehicle frame 1, the other end of the oil cylinder 5 is connected with the second end of the connecting cross beam 3, and the connecting cross beam 3 is able to be pulled into the vehicle frame box structure 4 by the extension and retraction of the oil cylinder 5 and locked.

Figure 11:
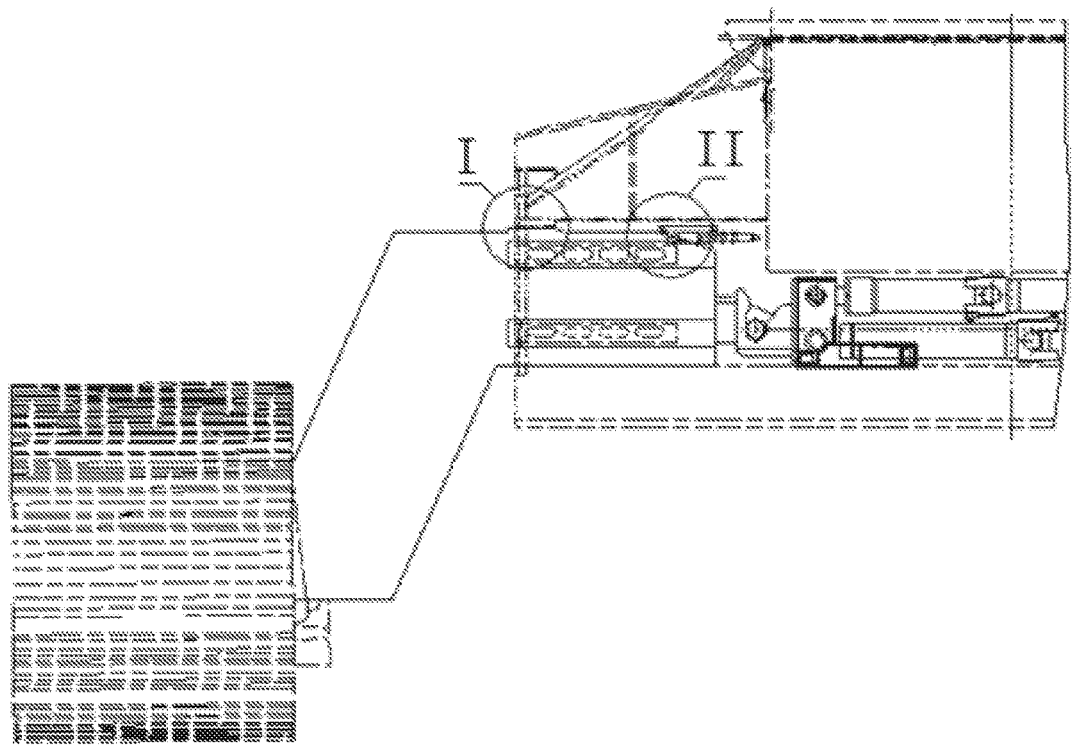
FIG. 11 is a structural schematic diagram of pull of the connecting cross beam to a locking position by the oil cylinder for locking provided by the present invention.
Figure 12:
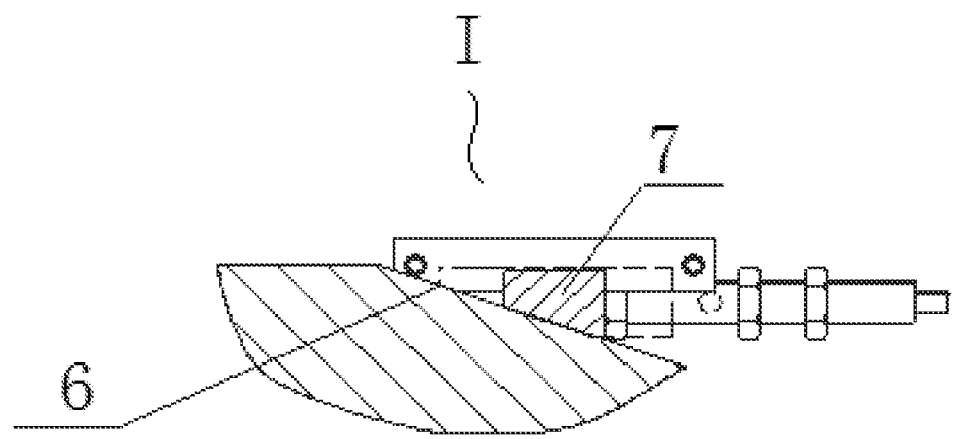
FIG. 12 is a schematic diagram of an "I" partial enlargement structure in FIG. 11.

As shown in FIG. 11 and FIG. 12, in the schematic embodiment of the track hitching structure for the wheeled crane provided by the present invention, the second end of the connecting cross beam 3 is inserted into the vehicle frame box structure 4, an inclined plane structure 6 is provided on the second end close to the oil cylinder 5, a locating wedge block 7 can be correspondingly arranged in the vehicle frame box structure 4, and when the oil cylinder 5 pulls the connecting cross beam 3 to a locking position in the vehicle frame box structure 4, the inclined plane structure 6 on the connecting cross beam 3 is engaged with the locating wedge block 7 so as to achieve the objective of fast lock.

In the above-mentioned schematic embodiment, when the connecting cross beam 3 is stretched to the locking position by the oil cylinder 5, the inclined plane structure 6 on the rear end of the connecting cross beam 3 is engaged with the locating wedge block 7 so as to lock the approach direction, and the departure direction is fixed by the tension of the oil cylinder 5, so the objective of fast lock is finally achieved. The locating wedge block 7 can be horizontally adjusted to handle processing errors, and thus the processing cost is reduced.

Figure 13:
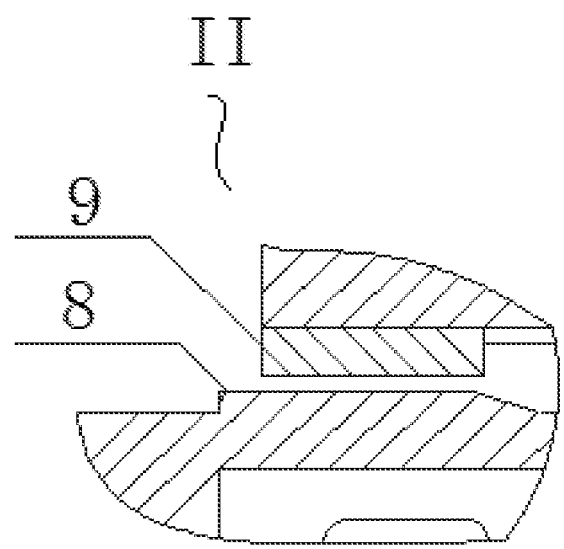
FIG. 13 is a schematic diagram of an "II" partial enlargement structure in FIG. 11.

As shown in FIG. 11 and FIG. 13, in the schematic embodiment of the track hitching structure for the wheeled crane provided by the present invention, the second end of the connecting cross beam 3 is inserted into the vehicle frame box structure 4, a position away from the oil cylinder 5 can be provided with a connecting cross beam lapping block 8, a vehicle frame lapping block 9 engaged with the connecting cross beam lapping block 8 can be correspondingly arranged in the vehicle frame box structure 4, and the connecting cross beam lapping block 8 cooperates with the vehicle frame lapping block 9 to transfer force.

In the above-mentioned schematic embodiment, since a partial lapping structure of the connecting cross beam lapping block 8 and the vehicle frame lapping block 9 is adopted, the overall cooperation of the box structure can be avoided, and only the precision of the position of a lapping point is guaranteed during processing, thus the processing difficulty is lowered. Moreover, by adoption of the structure, the force transfer can be regulated to pass through the position of the lapping point instead of the whole range of the box structure, so structural reinforcement only needs to be performed at the position of the lapping point instead of the whole range of the box structure, and accordingly the weight can be effectively reduced.

Figure 14:
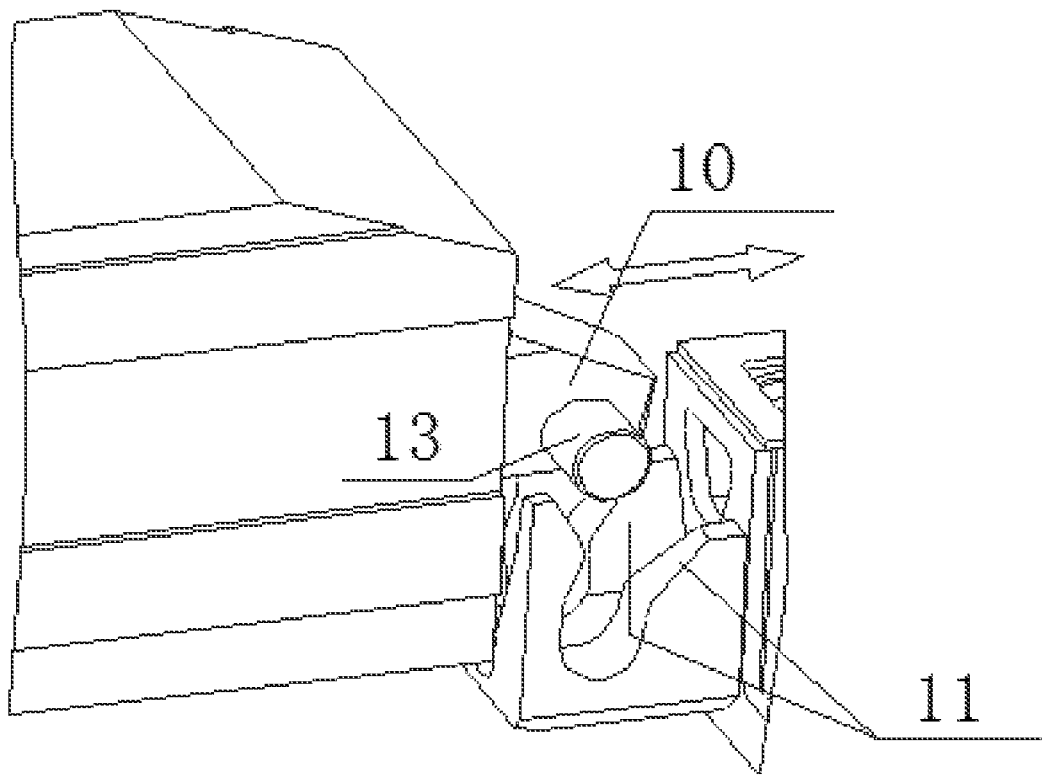
FIG. 14 is a schematic diagram of connection of a connecting lug seat and a guide seat provided by the present invention.
Figure 15:
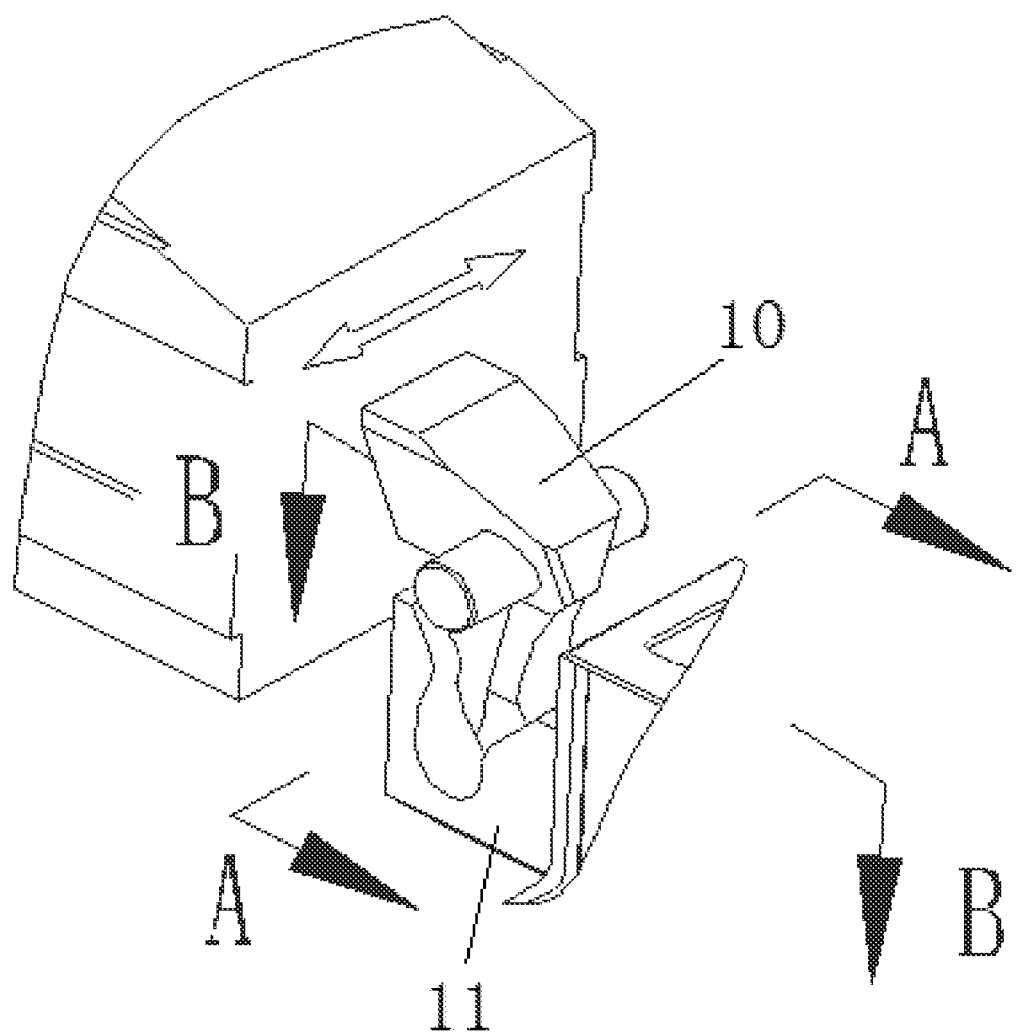
FIG. 15 is an enlarged schematic diagram of a partial structure of FIG. 14.
Figure 16:
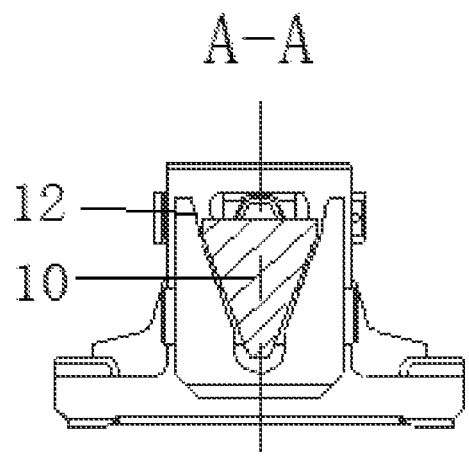
FIG. 16 is an A-A schematic diagram of FIG. 15.
Figure 17:
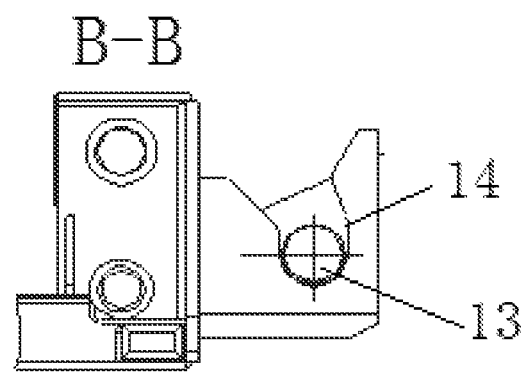
FIG. 17 is a B-B schematic diagram of FIG. 15.

As shown in FIG. 14 and FIG. 15, in the schematic embodiment of the track hitching structure for the wheeled crane provided by the present invention, the connecting cross beam 3 can be connected with the oil cylinder 5 by a connecting lug seat 10 and a guide seat 11, the connecting lug seat 10 can be arranged at the end part of the connecting cross beam 3, is V-shaped (as shown in FIG. 16) and has a wide upper part and a narrow lower part, the guide seat 11 can be arranged at the end part of the oil cylinder 5, a V-shaped groove 12 (as shown in FIG. 16) having a wide upper part and a narrow lower part is formed in the middle of the guide seat 11, the V-shaped connecting lug seat 10 is arranged in the V-shaped groove 12, a transverse connecting lug 13 is further arranged on the connecting lug seat 10, and both ends of the transverse connecting lug 13 are correspondingly arranged in two arc-shaped grooves 14 (as shown in FIG. 17), the two arc-shaped grooves are correspondingly arranged on both sides of the V-shaped groove 12 in the guide seat 11.

In the above-mentioned schematic embodiment, the connecting lug seat 10 and the V-shaped groove 12 that cooperate with each other form a V-shaped guide device, and the V-shaped guide device is in a cross layout, and thus can be adapted to the guide and adjustment in any direction. During butt joint, the V-shaped guide device has a guide function, increases the allowable error range of alignment of a hitching point of the track 2, improves the success rate of single-time hitching and reduces the installation time of the track 2.

Figure 18:
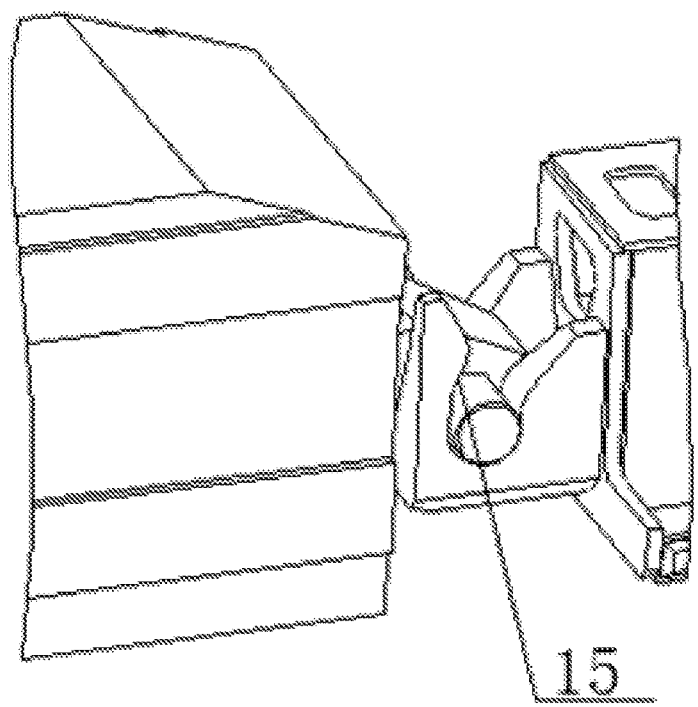
FIG. 18 is a schematic diagram of an anti-drop structure provided by the present invention.

As shown in FIG. 18, in the schematic embodiment of the track hitching structure for the wheeled crane provided by the present invention, a V-shaped opening can be formed in the upper part of the arc-shaped groove 14, the lower part of the arc-shaped groove 14 is of a semicircular structure, the transverse connecting lug 13 is placed in the semicircular structure, an anti-drop structure 15 protruding toward the interior of the arc-shaped groove 14 is arranged at an intersection position of the V-shaped opening and the semicircular structure, and the surface outline of the anti-drop structure 15 is of a curve structure.

Figure 19:
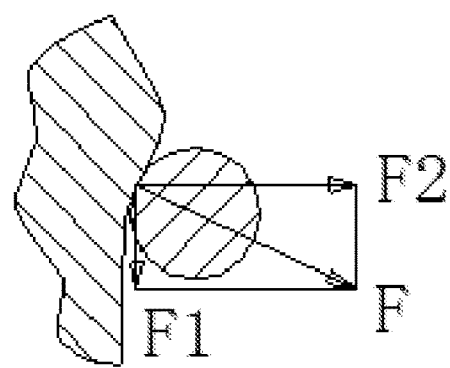
FIG. 19 is a schematic diagram of stress of a transverse connecting lug provided by the present invention after the anti-drop structure is arranged.

As shown in FIG. 19, in the above-mentioned schematic embodiment, the curvy anti-drop structure 15 is arranged in the arc-shaped groove 14, when the connecting cross beam 3 is stretched, the force F applied to the transverse connecting lug 13 has a downward component force F 1, and thus the transverse connecting lug 13 on the connecting lug seat 10 can be prevented from dropping out from the guide seat 11. The curve structure of the anti-drop structure 15 can be set by simulating the motion of the transverse connecting lug 13 in the arc-shaped groove 14 of the guide seat 11 so as to prevent installation difficulty caused by a too large curve angle and prevent a poor anti-drop effect caused by a too small curve angle, and the curvy anti-drop structure 15 provided by the present invention can replace the setting of a special anti-drop device, thereby simplifying the structure form and reducing cost.

Figure 20:
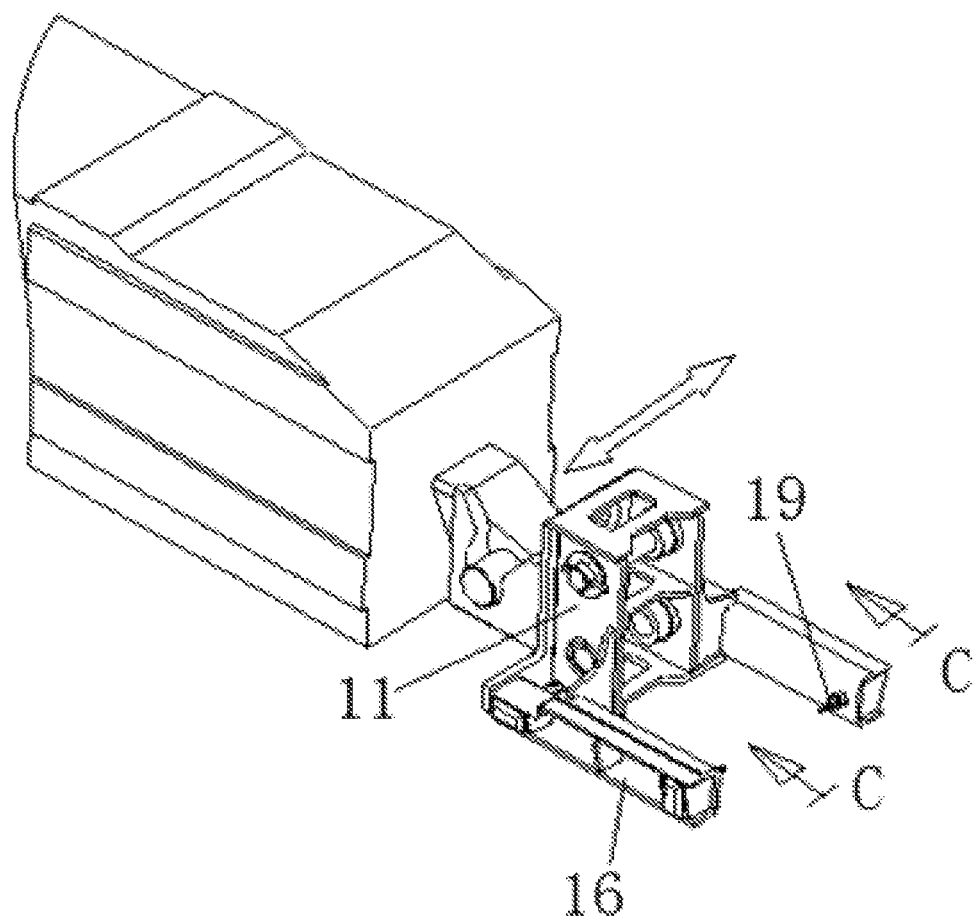
FIG. 20 is a structural schematic diagram of arrangement of a low-position guide beam on the guide seat provided by the present invention.
Figure 21:
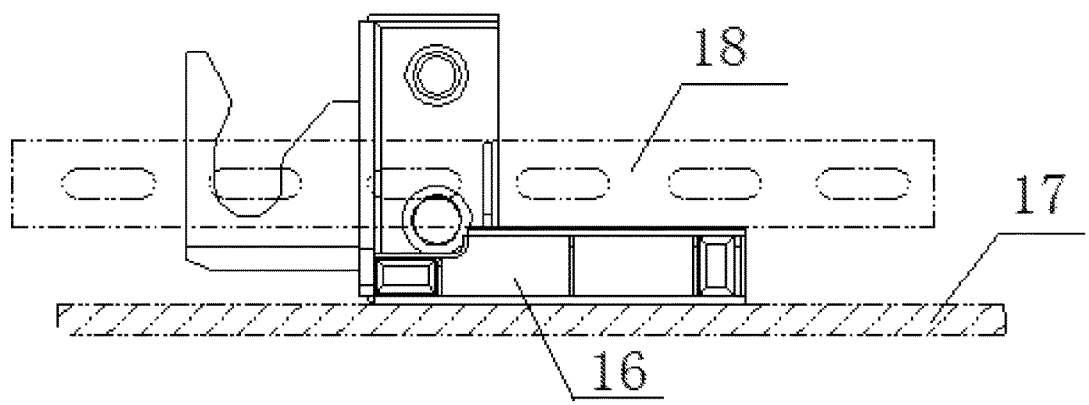
FIG. 21 is a structural schematic diagram of the low-position guide beam in a guide rail provided by the present invention.

As shown in FIG. 20, in the schematic embodiment of the track hitching structure for the wheeled crane provided by the present invention, low-position guide beams 16 are arranged at the lower parts of both sides of the guide seat 11; as shown in FIG. 21, guide rails are formed between a box-shaped bottom plate 17 in the vehicle frame box structure 4 and side edge locating plates 18 above both sides of the box-shaped bottom plate 17, and each low-position guide beam 16 correspondingly slides in one guide rail.

In the above-mentioned schematic embodiment, a low-position partial guide structure formed by the cooperation of the low-position guide beams 16 and the guide rails can prevent the up and down floatation of the guide seat 11 in a pull process, and since the low-position partial guide mode is adopted, compared with the conventional guide structure of upper and lower cover plates, the low-position partial guide structure is more stable and is low in weight.

As shown in FIG. 20, in the schematic embodiment of the track hitching structure for the wheeled crane provided by the present invention, alignment adjusting devices 19 for adjusting the guide seat 11 to align to the connecting lug seat 10 are arranged on the low-position guide beams 16 on both sides of the guide seat 11.

Figure 22:
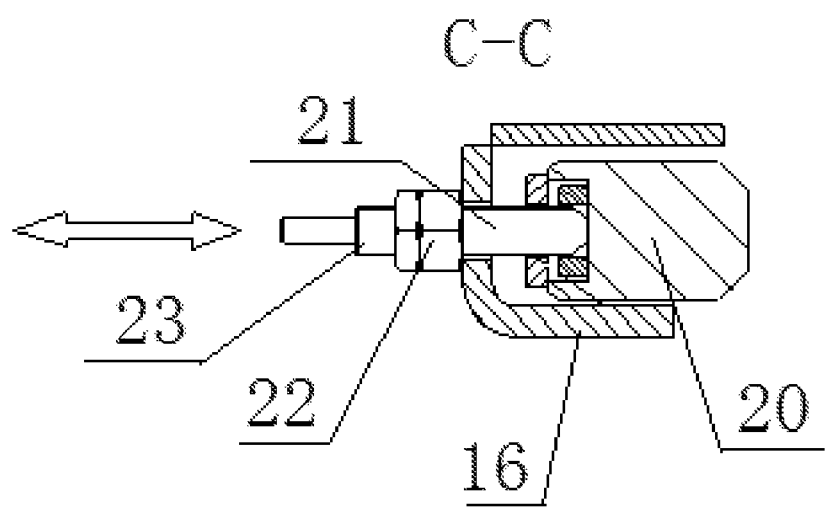
FIG. 22 is a C-C schematic diagram of FIG. 20.

As shown in FIG. 22, in a preferred or optional embodiment, the alignment adjusting device 19 can include an adjusting slider 20 arranged in the low-position guide beam 16, one end of the adjusting slider 20 abuts on the vehicle frame box structure 4, the other end of the adjusting slider 20 is connected with an adjusting bolt 21, the adjusting bolt 21 extends through the low-position guide beam 16 and is in threaded connection with an adjusting nut 22 that is fixedly arranged on the low-position guide beam 16, the adjusting slider 20 can be jacked on the vehicle frame box structure 4 by screwing the adjusting bolt 21, then the position of the guide seat 11 in the vehicle frame box structure 4 can be adjusted, in order to make the guide seat 11 align to the connecting lug seat 10, and after the guide seat aligns to the connecting lug seat, a fastening nut 23 can be arranged on the adjusting bolt 21 for fastening and locating.

In the above-mentioned schematic embodiment, the alignment adjusting device 19 is arranged on the width direction of the guide seat 11 to adapt to the processing error between the track 2 and the connecting cross beam 3.

Figure 23:
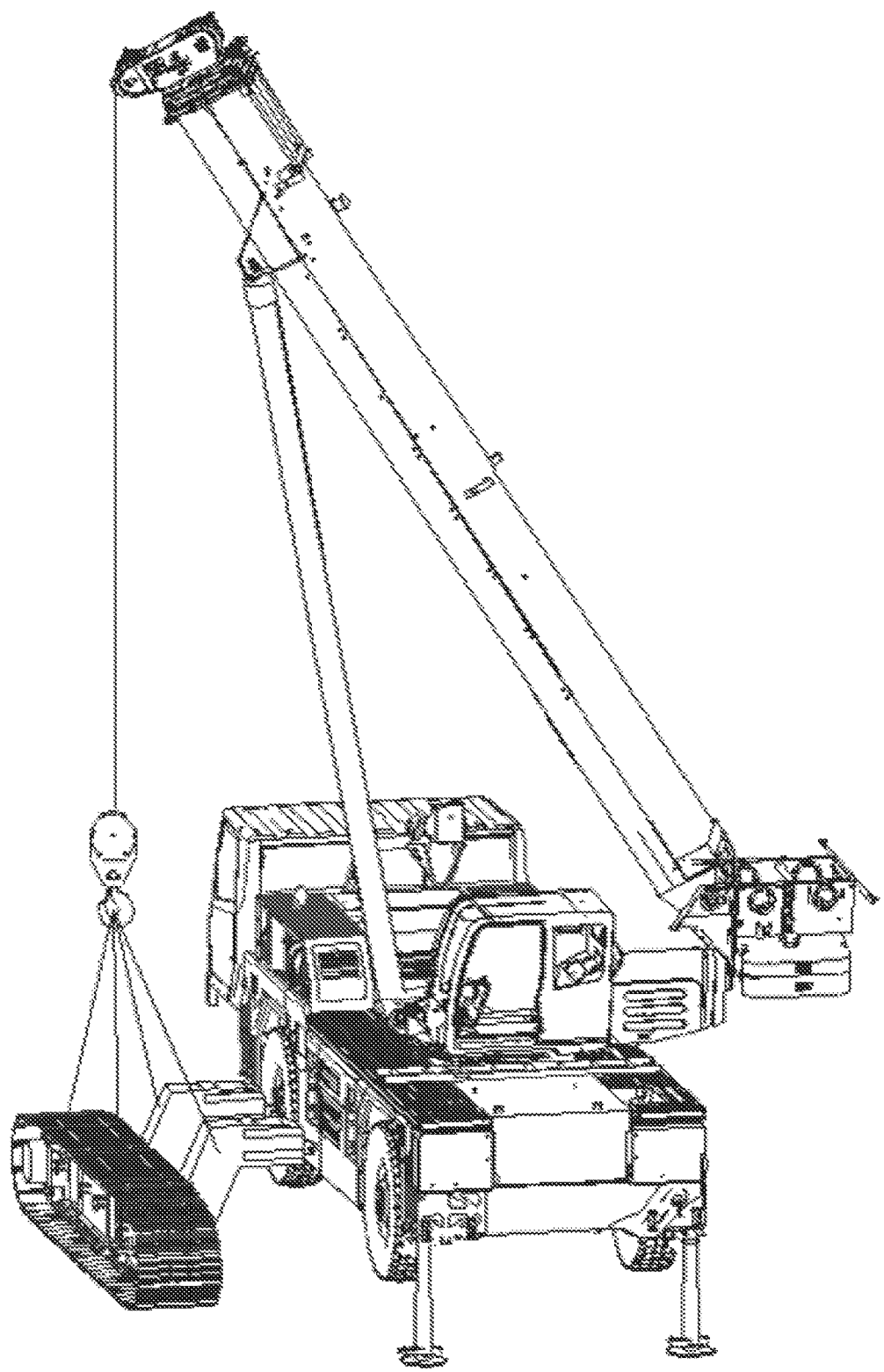
FIG. 23 is a structural schematic diagram of the wheeled crane can achieve the self assembly of the track provided by the present invention.

As shown in FIG. 23, the wheeled crane provided by the present invention includes the track hitching structure for the wheeled crane in any above-mentioned embodiment, and the wheeled crane cooperates with the track hitching structure for the wheeled crane by means of its own hoisting function to achieve the self disassembly and assembly of the track 2.

According to the wheeled crane provided by the present invention, the installation steps of the track hitching structure for the wheeled crane are as follows:

1) the supporting legs of the wheeled crane are supported, the integral track 2 and the connecting cross beam 3 are hoisted by its own hoisting ability of the wheeled crane, the V-shaped connecting lug seat 10 on the connecting cross beam 3 is put in the V-shaped groove 12 of the guide seat 11, and the transverse connecting lug 13 on the connecting lug seat 10 is correspondingly put in the arc-shaped groove 14 of the guide seat 11 to complete the hitch of the connecting cross beam 3 and the vehicle frame 1.

2) The box structure of the connecting cross beam 3 is pulled into the vehicle frame box structure 4 by the oil cylinder 5 until to the locking position and is locked, and then the state conversion from the wheeled crane to the track crane can be completed.

The track hitching structure for the wheeled crane provided by the present invention can achieve fast and efficient conversion of the wheeled crane and the track crane, improve the reliability and the use efficiency of the product and reduce the cost.

By means of the descriptions of the above-mentioned embodiments, it can be deduced that the present invention as least has the following advantages:

1) The track hitching structure for the wheeled crane provided by the present invention adopts the similarly Z-shaped integral track connecting cross beam structure with one high end and one low end, thereby simplifying the connecting structure between the track and the bottom plate of the race of the vehicle frame and reducing the working weight of the entire crane.

2) The track hitching structure for the wheeled crane provided by the present invention adopts a wedge-shaped fast locking mechanism and achieves the automatic lock of the track connection by the locking properties of the wedge-shaped structure and the locking function of the oil cylinder.

3) The track hitching structure for the wheeled crane provided by the present invention adopts the partial lapping structure to avoid the box-shaped overall cooperation, and only the precision of the position of the lapping point needs to be guaranteed during processing, thus the processing difficulty is lowered; and moreover, by adoption of the structure, the force transfer is regulated to pass through the position of the lapping point instead of the whole range of the box structure, so structural reinforcement only needs to be performed at the position of the lapping point instead of the whole range of the box structure, and accordingly the weight can be effectively reduced.

4) The track hitching structure for the wheeled crane provided by the present invention adopts the cross V-shaped guide device, thereby increasing the allowable error range of alignment of the hitching point of the track, improving the success rate of single-time hitching and saving the time for the installation of the track.

5) The track hitching structure for the wheeled crane provided by the present invention adopts the curvy anti-drop structure, thereby preventing the transverse connecting lug from dropping out from the guide seat when the track connecting cross beam is stretched, cancelling the setting of a special anti-drop device, simplifying the structure form and reducing the cost.

6) The track hitching structure for the wheeled crane provided by the present invention adopts the rail type alignment adjusting device, so that the horizontal transverse position of a pull device can be adjusted so as to be adapted to the manufacturing error of a relative position between the vehicle frame box structure and the track connecting cross beam, and the processing precision is reduced.

7) The track hitching structure for the wheeled crane provided by the present invention adopts the low-position partial guide structure to limit the upper and lower motion of the pull device so as to ensure its stable operation; and in addition, due to the low-position partial setting of the guide structure, compared with the conventional guide structure of upper and lower cover plates, the weight is reduced, and the cost is low.

8) The wheeled crane provided by the present invention can achieve the self disassembly and assembly of the track by its own hoisting function without using auxiliary equipment, so that the use cost is reduced.

Finally, it should be noted that the above-mentioned embodiments are merely used for illustrating the technical solutions of the present invention, rather than limiting them; although the present invention has been described in detail with reference to the preferred embodiments, those of ordinary skill in the art to which the present invention belongs should understand that they could still make modifications to the embodiments of the present invention or make equivalent substitutions to a part of technical features; and these modifications or substitutions should fall into the protection scope of the technical solutions of the present invention without departing from the spirit of the technical solutions of the present invention.

What is claimed is:

1. A track hitching structure for a wheeled crane, comprising a vehicle frame (1) and a connecting cross beam (3), wherein the first end of the connecting cross beam (3) is connected with a track (2), the second end of the connecting cross beam (3) is connected with the vehicle frame (1), and the second end of the connecting cross beam (3) is higher than the first end of the connecting cross beam (3), wherein the connecting cross beam (3) is of a box structure, a vehicle frame box structure (4) matched with the connecting cross beam (3) is arranged on the vehicle frame (1), and the connecting cross beam (3) is inserted into the vehicle frame box structure (4), wherein an oil cylinder (5) is arranged in the vehicle frame box structure (4), one end of the oil cylinder (5) is fixedly connected with the vehicle frame (1), the other end of the oil cylinder (5) is connected with the second end of the connecting cross beam (3), and the connecting cross beam (3) is able to be pulled into the vehicle frame box structure (4) by the oil cylinder (5) and locked, and wherein the second end of the connecting cross beam (3) is inserted into the vehicle frame box structure (4), an inclined plane structure (6) is provided on the second end close to the oil cylinder (5), a locating wedge block (7) is arranged in the vehicle frame box structure (4), and when the oil cylinder (5) pulls the connecting cross beam (3) to a locking position in the vehicle frame box structure (4), the inclined plane structure (6) on the connecting cross beam (3) is engaged with the locating wedge block (7).

2. The track hitching structure for the wheeled crane of claim 1, wherein the connecting cross beam (3) is of an integral structure and is in the shape of Z, S or a bent beam shape with a high end and a low end.

3. The track hitching structure for the wheeled crane of claim 1, wherein the second end of the connecting cross beam (3) is inserted into the vehicle frame box structure (4), a position on the second end away from the oil cylinder (5) is provided with a connecting cross beam lapping block (8), and a vehicle frame lapping block (9) engaged with the connecting cross beam lapping block (8) is arranged in the vehicle frame box structure (4).

4. The track hitching structure for the wheeled crane of claim 1, wherein the connecting cross beam (3) is connected with the oil cylinder (5) by a connecting lug seat (10) and a guide seat (11), the connecting lug seat (10) is arranged at the second end of the connecting cross beam (3), is V-shaped and has a wide upper part and a narrow lower part, the guide seat (11) is arranged at an end of the oil cylinder (5), a V-shaped groove (12) having a wide upper part and a narrow lower part is formed in the middle of the guide seat (11), the V-shaped connecting lug seat (10) is arranged in the V-shaped groove (12), a transverse connecting lug (13) is further arranged on the connecting lug seat (10), and both ends of the transverse connecting lug (13) are correspondingly arranged in two arc-shaped grooves (14), the two arc-shaped grooves are correspondingly arranged on both sides of the V-shaped groove (12) in the guide seat (11).

5. The track hitching structure for the wheeled crane of claim 4, wherein a V-shaped opening is formed in the upper part of the arc-shaped groove (14), the lower part of the arc-shaped groove (14) is of a semicircular structure, the transverse connecting lug (13) is placed in the semicircular structure, and an anti-drop structure (15) protruding toward the interior of the arc-shaped groove (14) is arranged at an intersection position of the V-shaped opening and the semicircular structure.

6. The track hitching structure for the wheeled crane of claim 4, wherein low-position guide beams (16) are arranged at the lower parts of both sides of the guide seat (11), guide rails are formed between a bottom plate in the vehicle frame box structure (4) and side edge locating plates (18) above both sides of the bottom plate, and each low-position guide beam (16) correspondingly slides in one guide rail.

7. The track hitching structure for the wheeled crane of claim 6, wherein alignment adjusting devices (19) for adjusting the guide seat (11) to align to the connecting lug seat (10) are arranged on the guide beams on both sides of the guide seat (11).

8. The track hitching structure for the wheeled crane of claim 7, wherein the alignment adjusting device (19) comprises an adjusting slider (20) arranged in the low-position guide beam (16), one end of the adjusting slider (20) abuts on the vehicle frame box structure (4), the other end of the adjusting slider (20) is connected with an adjusting bolt (21), the adjusting bolt (21) extends through the low-position guide beam (16) and is in threaded connection with an adjusting nut (22) that is fixedly arranged on the low-position guide beam (16), and after the guide seat (11) is adjusted to align to the connecting lug seat (10) by the adjusting bolt (21) and the adjusting slider (20), a fastening nut (23) is arranged on the adjusting bolt (21) for locating.

9. A wheeled crane, comprising a track (2) and a track hitching structure for the wheeled crane, the track hitching structure comprising a vehicle frame (1) and a connecting cross beam (3), wherein the first end of the connecting cross beam (3) is connected with the track (2), the second end of the connecting cross beam (3) is connected with the vehicle frame (1), and the second end of the connecting cross beam (3) is higher than the first end of the connecting cross beam (3);

wherein the connecting cross beam (3) is of a box structure, a vehicle frame box structure (4) matched with the connecting cross beam (3) is arranged on the vehicle frame (1), and the connecting cross beam (3) is inserted into the vehicle frame box structure (4), wherein an oil cylinder (5) is arranged in the vehicle frame box structure (4), one end of the oil cylinder (5) is fixedly connected with the vehicle frame (1), the other end of the oil cylinder (5) is connected with the second end of the connecting cross beam (3), and the connecting cross beam (3) is able to be pulled into the vehicle frame box structure (4) by the oil cylinder (5) and locked, and wherein the second end of the connecting cross beam (3) is inserted into the vehicle frame box structure (4), an inclined plane structure (6) is provided on the second end close to the oil cylinder (5), a locating wedge block (7) is arranged in the vehicle frame box structure (4), and when the oil cylinder (5) pulls the connecting cross beam (3) to a locking position in the vehicle frame box structure (4), the inclined plane structure (6) on the connecting cross beam (3) is engaged with the locating wedge block (7)

wherein the wheeled crane cooperates with the track hitching structure for the wheeled crane by way of a hoisting function of the wheel crane to achieve a self-disassembly and assembly of the track (2).

10. The wheeled crane of claim 9, wherein the connecting cross beam (3) is of an integral structure and is in the shape of Z, S or a bent beam shape with a high end and a low end.

11. The wheeled crane of claim 9, wherein the second end of the connecting cross beam (3) is inserted into the vehicle frame box structure (4), a position on the second end away from the oil cylinder (5) is provided with a connecting cross beam lapping block (8), and a vehicle frame lapping block (9) engaged with the connecting cross beam lapping block (8) is arranged in the vehicle frame box structure (4).

12. The wheeled crane of claim 9, wherein the connecting cross beam (3) is connected with the oil cylinder (5) by a connecting lug seat (10) and a guide seat (11), the connecting lug seat (10) is arranged at the second end of the connecting cross beam (3), is V-shaped and has a wide upper part and a narrow lower part, the guide seat (11) is arranged at an end of the oil cylinder (5), a V-shaped groove (12) having a wide upper part and a narrow lower part is formed in the middle of the guide seat (11), the V-shaped connecting lug seat (10) is arranged in the V-shaped groove (12), a transverse connecting lug (13) is further arranged on the connecting lug seat (10), and both ends of the transverse connecting lug (13) are correspondingly arranged in two arc-shaped grooves (14), the two arc-shaped grooves are correspondingly arranged on both sides of the V-shaped groove (12) in the guide seat (11).

13. The track hitching structure for the wheeled crane of claim 12, wherein a V-shaped opening is formed in the upper part of the arc-shaped groove (14), the lower part of the arc-shaped groove (14) is of a semicircular structure, the transverse connecting lug (13) is placed in the semicircular structure, and an anti-drop structure (15) protruding toward the interior of the arc-shaped groove (14) is arranged at an intersection position of the V-shaped opening and the semicircular structure.

14. The track hitching structure for the wheeled crane of claim 12, wherein low-position guide beams (16) are arranged at the lower parts of both sides of the guide seat (11), guide rails are formed between a bottom plate in the vehicle frame box structure (4) and side edge locating plates (18) above both sides of the bottom plate, and each low-position guide beam (16) correspondingly slides in one guide rail.

15. The track hitching structure for the wheeled crane of claim 14, wherein alignment adjusting devices (19) for adjusting the guide seat (11) to align to the connecting lug seat (10) are arranged on the guide beams on both sides of the guide seat (11).

16. The track hitching structure for the wheeled crane of claim 15, wherein the alignment adjusting device (19) comprises an adjusting slider (20) arranged in the low-position guide beam (16), one end of the adjusting slider (20) abuts on the vehicle frame box structure (4), the other end of the adjusting slider (20) is connected with an adjusting bolt (21), the adjusting bolt (21) extends through the low-position guide beam (16) and is in threaded connection with an adjusting nut (22) that is fixedly arranged on the low-position guide beam (16), and after the guide seat (11) is adjusted to align to the connecting lug seat (10) by the adjusting bolt (21) and the adjusting slider (20), a fastening nut (23) is arranged on the adjusting bolt (21) for locating.

* * * * *